Oct. 31, 1939.　　　F. P. GARDNER　　　2,177,646
METHOD OF AND MACHINE FOR ABSTRACTING AND PREPARING FIBERS
Filed Feb. 27, 1936　　　7 Sheets-Sheet 2

INVENTOR
Frederick P. Gardner
BY
Alexander C. Proudfit
ATTORNEY

Oct. 31, 1939.   F. P. GARDNER   2,177,646
METHOD OF AND MACHINE FOR ABSTRACTING AND PREPARING FIBERS
Filed Feb. 27, 1936   7 Sheets-Sheet 3
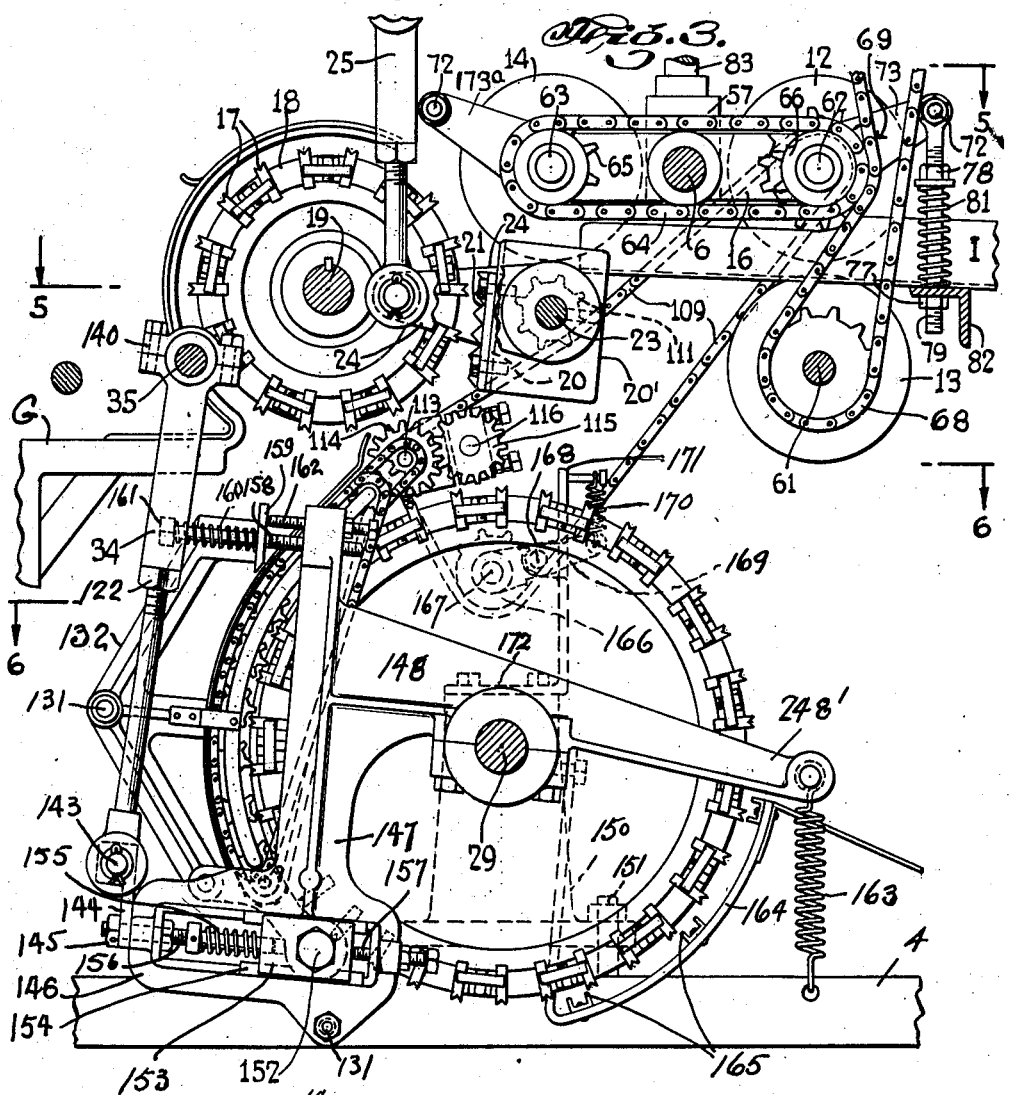
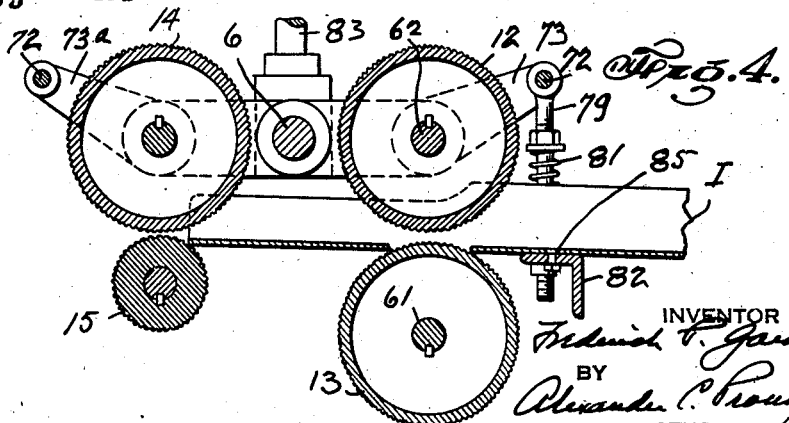

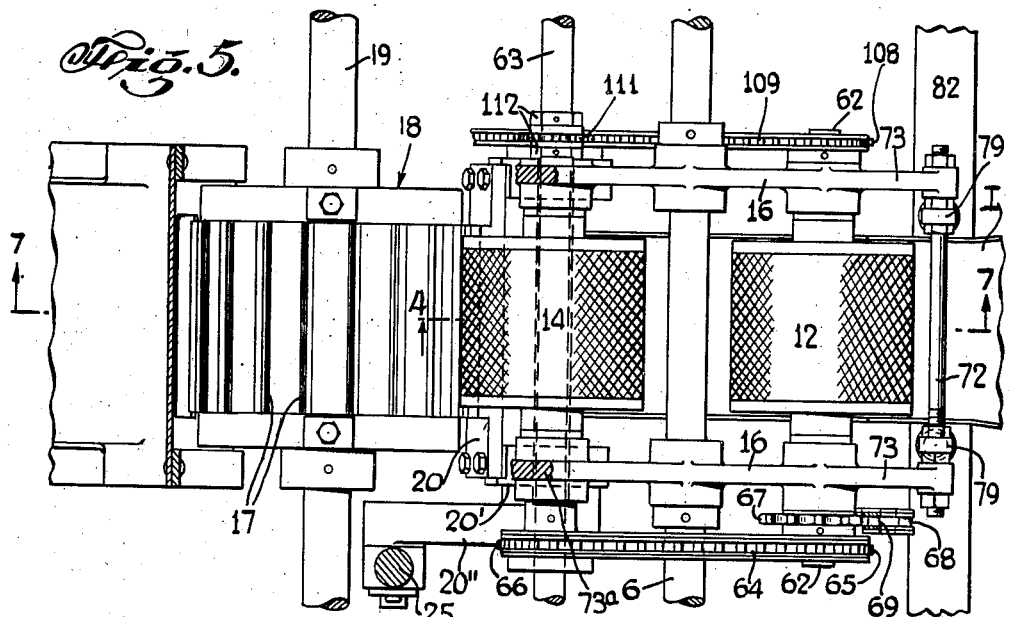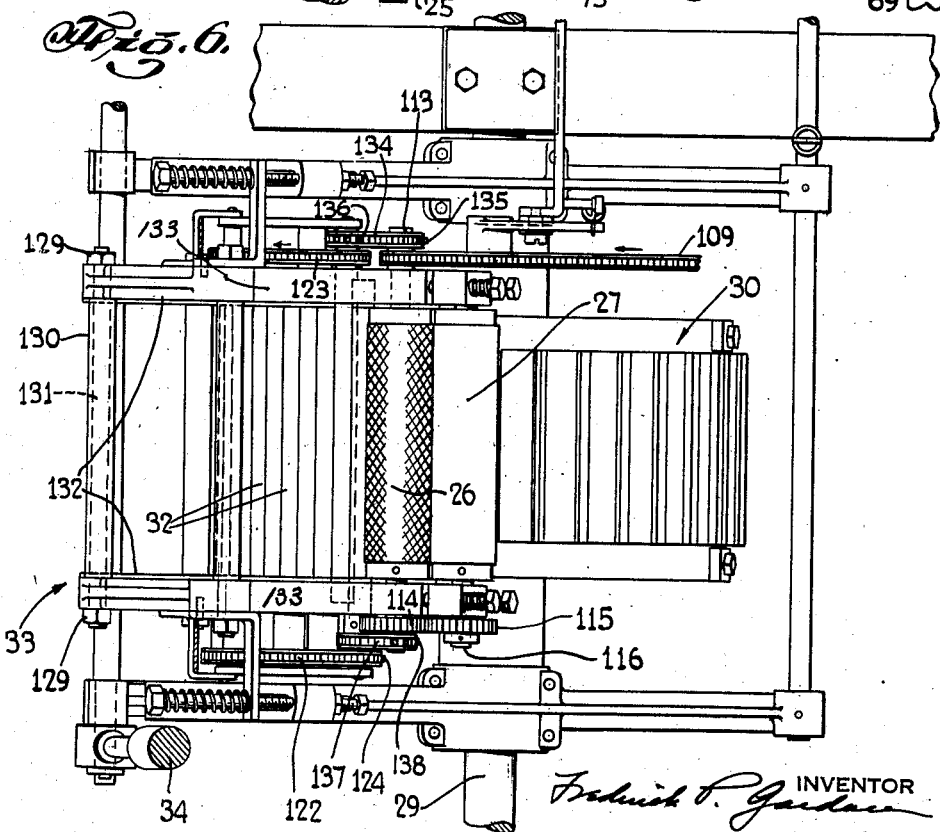

Oct. 31, 1939.　　F. P. GARDNER　　2,177,646
METHOD OF AND MACHINE FOR ABSTRACTING AND PREPARING FIBERS
Filed Feb. 27, 1936　　7 Sheets-Sheet 5

INVENTOR
Frederick P. Gardner
BY
Alexander C. Proudfit
ATTORNEY

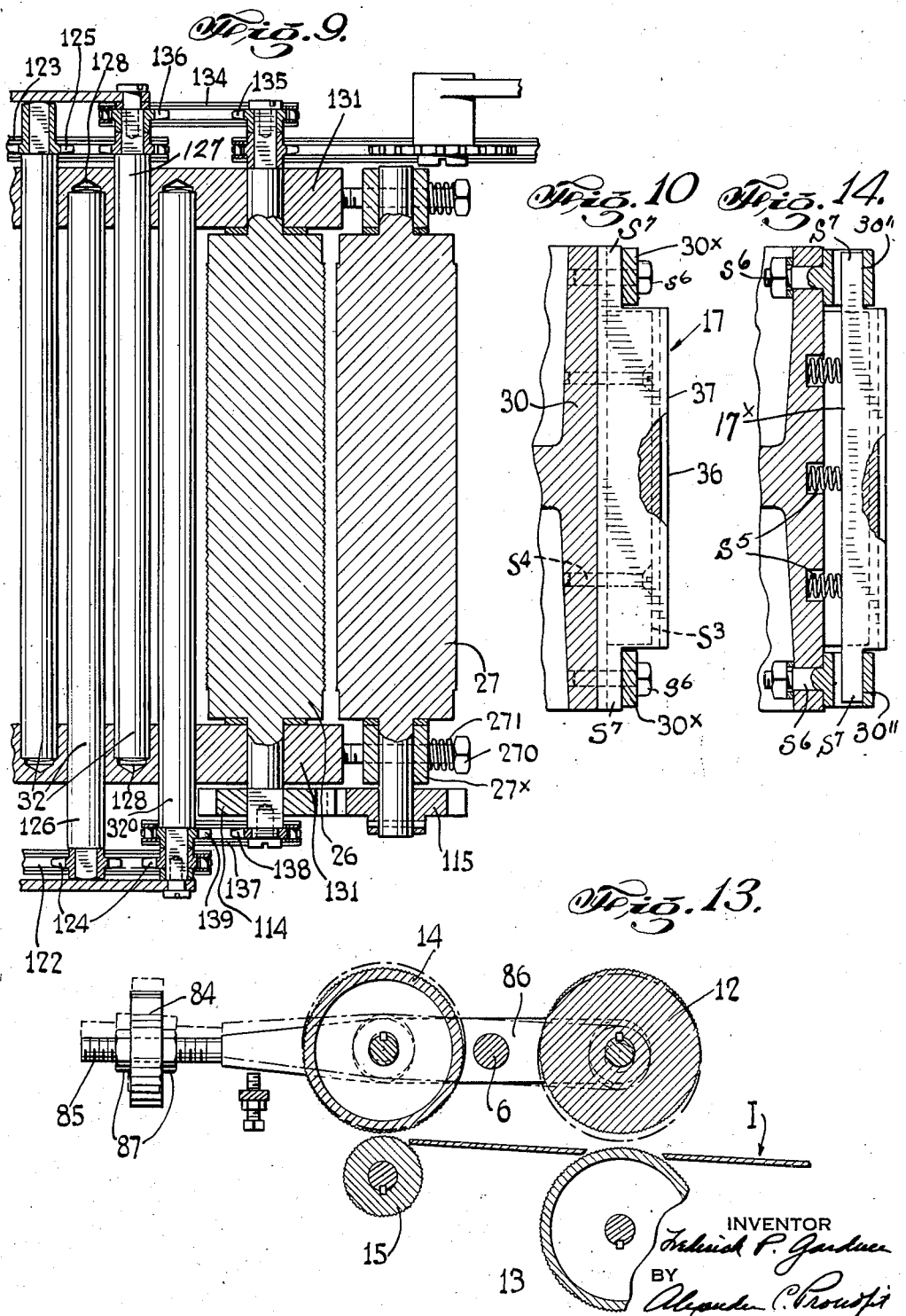

Oct. 31, 1939.  F. P. GARDNER  2,177,646
METHOD OF AND MACHINE FOR ABSTRACTING AND PREPARING FIBERS
Filed Feb. 27, 1936  7 Sheets-Sheet 7
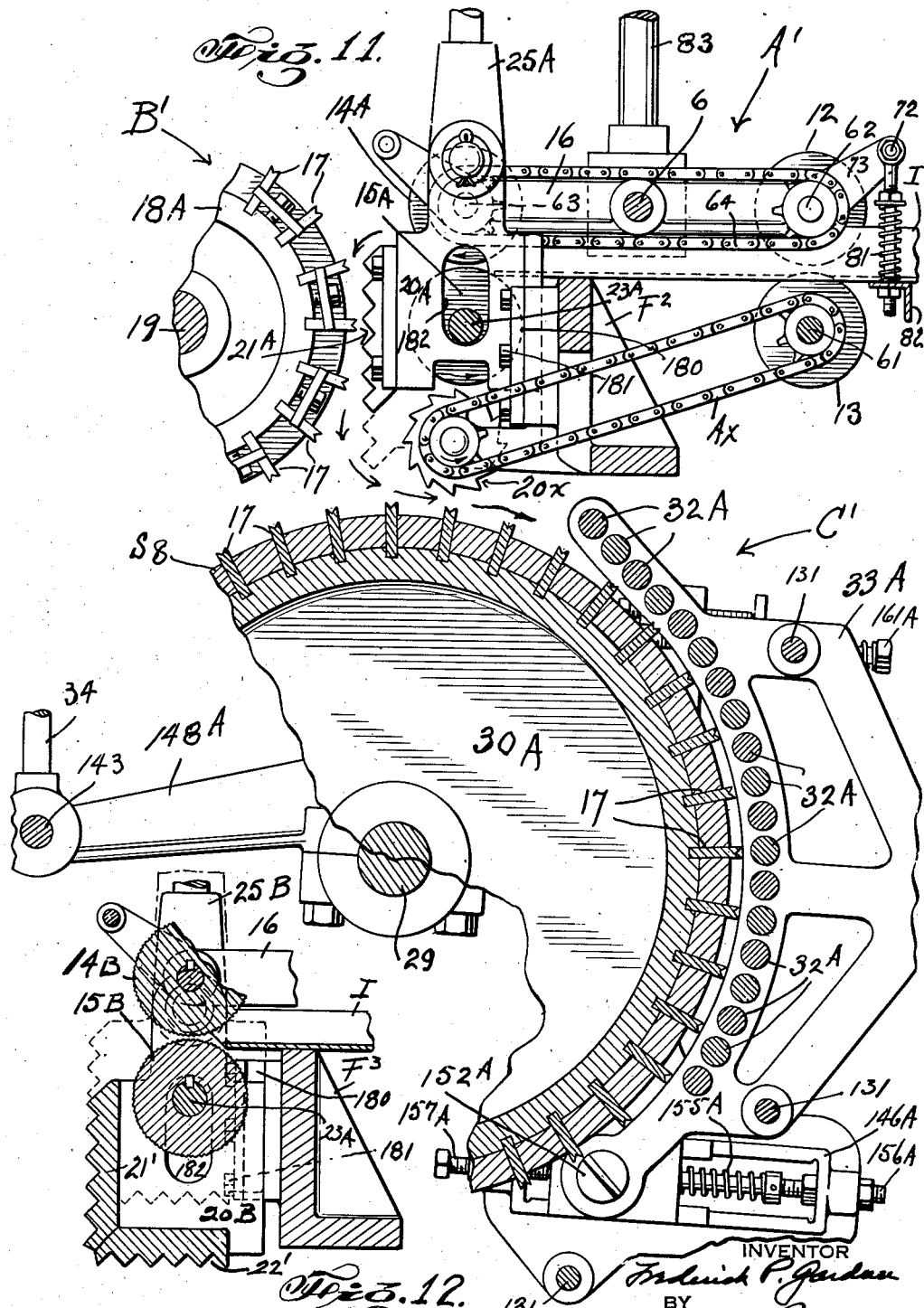

Patented Oct. 31, 1939

2,177,646

UNITED STATES PATENT OFFICE 2,177,646

METHOD OF AND MACHINE FOR ABSTRACTING AND PREPARING FIBERS

Frederick P. Gardner, New York, N. Y.

Application February 27, 1936, Serial No. 66,022

21 Claims. (Cl. 19—24)

This invention relates to the abstraction and preparation of fibers from the fiber-bearing portions of plants, such as the leaves of various members of the genus to which the pineapple of commerce belongs, and of the maguey, sansevieria, abaca and like plants, to name only a few well-known and representative examples of a wide range of sources of leaf fibers and allied products susceptible of commercial and profitable recovery by a novel method which I have disclosed and claimed in my co-pending application for United States Letters Patent, Ser. No. 62,018. The present invention, while not limited to utilization in connection with the illustrative examples described in the aforesaid application, relates to the provision of apparatus by which that method may be carried into effect, and in pursuance of this general object, a particular object of the present invention is to provide a machine by which may be effected a more complete recovery of fiber from pineapple leaves, for example, than has heretofore been possible, either by machines, or by the aboriginal hand method practised for centuries. The pineapple leaf contains, in a fleshy matrix, a double series of fibers, of which the layer at the front of the leaf is embedded in a relatively thick body of the fleshy material, somewhat less firmly held than are the fibers in the posterior layer, where the matrix is of a tough, rubbery character.

Owing to the difficulty in extracting the posterior fibers, the natives usually extract only the first-named front series of fibers by the hand method, and are accustomed to throw away the residue, thus wasting a large proportion of useful fiber, and the machines heretofore devised for extracting the fibers from pineapple leaves have not afforded a satisfactory means for commercial abstraction of the layer of fiber at the front of the leaf, and are totally incapable of abstracting the posterior fibers.

Under such conditions, and as the result of many years of experimentation and trial of various methods of procedure in the extraction of plant fibers, I have devised a machine for abstracting and preparing fiber from pineapple leaves and like sources which comprises a series of co-ordinated mechanisms each adapted to carry out a step of my novel method. This series includes first a mechanism for performing the initial step of bending and preparing the leaves or other fiber-bearing material to break down the resistance of the rubbery matrix, and also to extract the liquid components, and to equalize the cross-sectional area of the material for the subsequent stages of treatment. Following this mechanism in the organization of the machine, I have provided mechanisms for treating the fibrous material between edged instruments working simultaneously against both faces of the material, while drawing it backward and forward therebetween, and feeding the material progressively between the edged instrument, whereby the non-fibrous components associated with the fibers are treated, broken down and removed simultaneously from both faces of the material, and from all surfaces of the individual fibers.

In the preferred form of machine, the mechanism for carrying out the next step of my novel method after the preparation step, is characterized by means for kneading the prepared material against an edged blade, preferably against a series of such edged blades in rapid succession, such means including another edged instrument, or series thereof which are applied to the other side of the material, the last-named series of edged instruments being constructed and arranged to move to and fro across the face of the first-named series of edged instruments, in such a manner that the material is drawn backward and forward between the edged instruments.

The non-fibrous components are repeatedly and thoroughly kneaded, broken down and removed simultaneously from both sides of the fibrous structure, by this mechanism, while at the same time the fibrous material is fed forward progressively between the complemental series of edged instruments. Said mechanism for exerting simultaneous kneading and cleaning action at both sides of the fibrous material is a feature of my machine which is completely novel and of the greatest importance and may be embodied in a suitable series of kneading couples comprising as many units as may be found desirable in the treatment of any given material.

My novel machine comprises a mechanism for performing the further step of causing the fiber, thus pre-cleaned, to be kneaded against another series of similar edged instruments moving constantly in a preferably arcuate path, by an oscillating force comprising a series of rollers which are moved to and fro in an arcuate path parallel to that of the edged instruments and closely adjacent thereto, the material being held yieldingly to control its progressive advancement under the action of said forwardly moving edged instruments, at the same time that the oscillating movement of the rollers causes a backward and forward reciprocation of the material in its arcuate path, as it moves forward.

According to the invention the rollers are caused to change their positions relatively to the surface of the material constantly and with such frequency that as the material moves forward every portion of its surface is simultaneously and repeatedly kneaded and cleaned, the non-fibrous components being completely disintegrated between the edged instruments and the rollers, which are rotated constantly, regardless of the direction of their oscillation, so that they remove the disintegrated material continuously and completely. By this means the accumulation of disintegrated material is at all times obviated, and the machine operates at all times in a self-cleaning manner. In fact, due to the oscillation of these rollers, their aggregate surface in contact with the material at all times is virtually the equivalent of an uninterrupted, continuous surface of large area rather than of an aggregation of spaced, linear regions of contact, such as the rolls would present to the material if the series of rolls was not oscillated bodily.

At the same time, and as part of the unitary operation constituted by the successive steps of the novel method, the complete fibrous structure of the leaf or other fiber-bearing structure, stripped of all non-fibrous components, and maintained in the true original parallel arrangement of its component fibers, is delivered without bruising, cutting or other impairment of its natural properties, as an entity for useful employment.

The above preparing, kneading, cleaning and polishing operation may be performed more than once, as by a suitable series of kneading couples of the type including a rotor and an arcuate set of rollers worked by an oscillating sector, and in each kneading stage of the method, the successive kneading couples may be alternately arranged so that the rotor of one couple is disposed at one side of the material and the rotor of the next couple is disposed at the opposite side of the material, or there may be a plurality of successive kneading couples in which the rotors are disposed at the same side of the material.

Fig. 3 is a fragmentary, detail view in vertical section, and upon an enlarged scale, taken on the line 3—3 of Fig. 1;

Fig. 4 is a fragmentary, detail view in vertical section, also upon an enlarged scale, taken on the partial line 4 of Fig. 5;

Fig. 5 is a fragmentary, detail view in horizontal section, taken on the line 5—5 of Fig. 3;

Fig. 6 is a similar view in horizontal section, taken on the line 6—6 of Fig. 3;

Fig. 9 is a greatly enlarged detail view in section on the line 9—9 of Fig. 7;

Fig. 10 is a similar detail view in section on the line 10—10 of Fig. 7;

Fig. 11 is a fragmentary, detail view of a somewhat diagrammatic character, in elevation, and partly in section, of a modification;

Fig. 12 is a sectional detail of parts shown in Fig. 11, showing another modification; thereof;

Fig. 13 is a schematic detail view, similar to Fig. 8, illustrating the mode of operation of the feeding rolls, and also showing certain structural parts not illustrated in Fig. 8;

Fig. 14 is a fragmentary detail view in section, similar to Fig. 10, but illustrating a modified form of scutching blade and its supporting structure.

Figure 1:
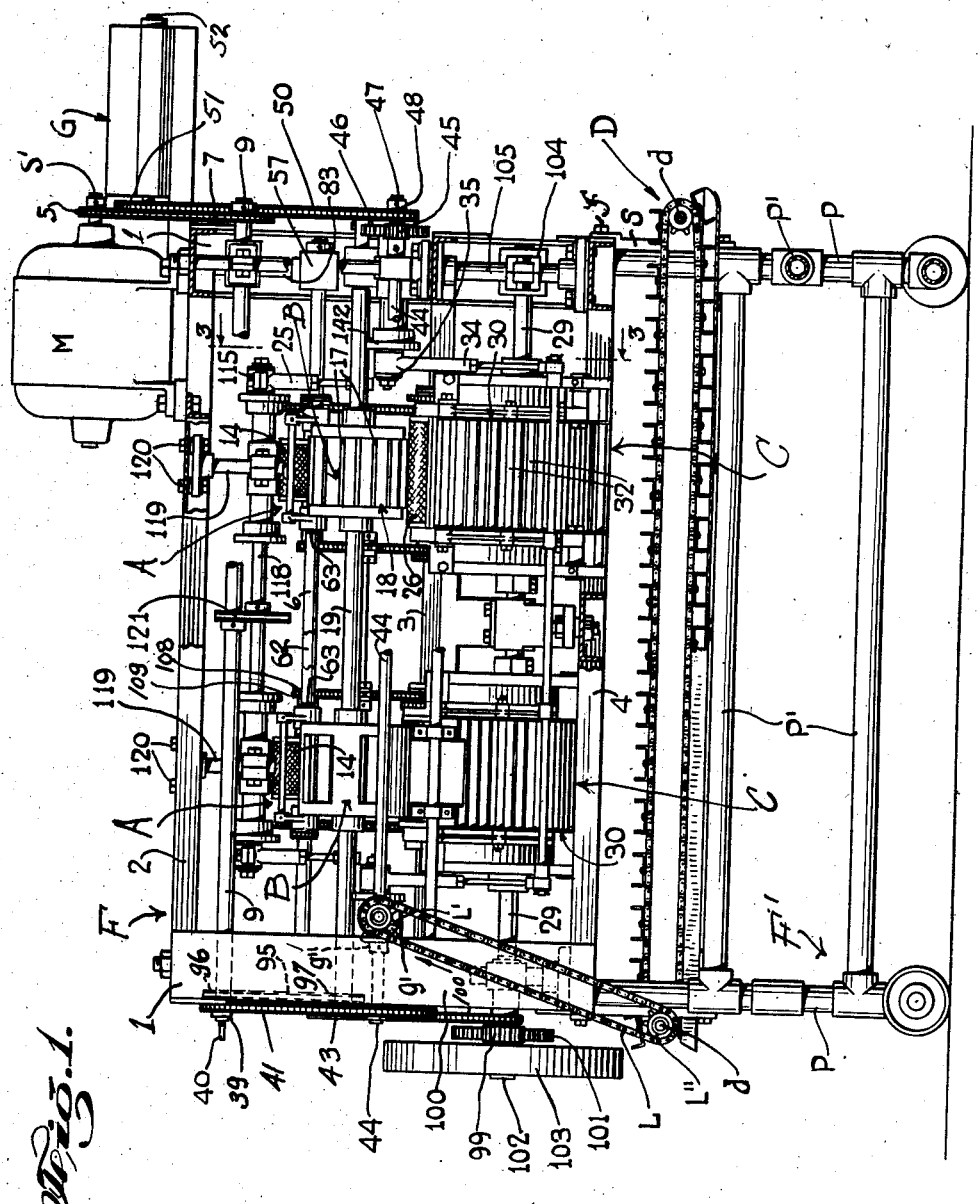
Fig. 1 is a view in elevation of a machine in the construction of which my improvements have been embodied.

In a now-preferred embodiment of the invention selected for illustration, I have combined a mechanism for preparing the fibrous material for further treatment, with a mechanism for performing an initial kneading and cleaning operation, and a mechanism for completing the kneading, cleaning and polishing of the fibers, and for delivering the fibers in utilizable form separately from the non-fibrous solid components of the fibrous material, and separately from the liquid components.

In order that the co-ordination of these mechanisms may be more readily understood, I will describe briefly their general structure and combinative relationship, before entering upon a more detailed description of the supporting structure as shown in the drawings. For the purpose of this brief preliminary review, reference may be had to Fig. 7 in which the preparatory mechanism is designated generally by the reference character A while B designates generally the mechanism adapted to effect the initial stage of kneading and cleaning, and C designates the mechanism in which is completed the kneading, cleaning and polishing of the fibers and their discharge from the machine.

In pursuance of the invention, the mechanism composing the preparatory stage A, includes a train of roll-couples 12—13 and 14—15, which act to prepare the leaves or other fibrous material, expel the liquid components therefrom, and equalize the cross-sectional area of the fiber-bearing leaf or other structure.

This feeding arrangement possesses the distinctive feature that one of the roll-components of each couple—the upper rolls, 12 and 14, in the instance shown—are mounted on a rock-arm 16, these upper rolls being thereby organized to float and to compensate tiltingly for the differences in thickness which are characteristic of the point and butt ends of such leaves as pineapple and other leaves, and for other variations in dimensions found in many other fiber-bearing plant structures.

When such fibrous materials as the leaves of the pineapple plants are fed point first through the roll-couple 12—13, it will be understood that as the point is of course much thinner than the butt of the leaf, the rolls 12—13 will be so set as to permit the point end of the leaf and the relatively thin middle part of the leaf to pass freely through to the roll-couple 14—15, and when a thicker portion of the leaf runs into the bite of the rolls 14—15, the roll 14 is forced away from roll 15, the arm 16 is tilted around its axis 6 and the roll 12 is forced down upon the leaf as it moves forward, crushing it to equalize its cross-sectional area, and to expel the liquid components, thus preparing the fibrous material for further treatment.

The above provision for compensating tilting action at the region of the feed is highly important, providing as it does for the first time a means for facilitating entry of the curved leaves of the pineapple and like plants into the crushing rolls, and providing also for automatically bringing into play a preparing force which acts to reduce the cross-sectional area of the leaf in a predetermined manner, not dependent upon the skill or experience of the operator, whose judgment is often an uncertain factor. The above free entry is accomplished by this feature of the invention without interfering with the eventual application of a crushing force proportioned to the thickness and other characteristics of the material.

The feeding stage in which this feature of the invention is carried into effect can be of greater or less extent, according to the nature of the material under treatment, and, for example, additional preparatory couples of rolls may be introduced, as a continuous train, to meet special conditions arising with different forms of fibrous material, without impairing the usefulness of the improved treatment which is carried into effect throughout the other mechanisms of the machine. The invention also contemplates feeding the leaves butt-end first, where such a mode of feeding will contribute to the successful accomplishment of further stages of the treatment.

From the feed-roll-couples the crushed material proceeds into mechanism adapted to carry into effect the next stage or phase of the treatment, which is characterized by a novel kneading and cleaning effect, that is performed, in the instance illustrated, by and between a series of edge instruments 17 mounted in the periphery of a rotor 18 which is turned constantly clockwise by a shaft 19 driven by a suitable source of power to be described later herein.

Opposed to this set of edged instruments, at about the horizontal axial plane, is a reciprocating kneading head 20 whose serrated face 21 comprises a somewhat similar edged instrument formation, but preferably the edges of this series are formed integrally with each other and the face 21, being designed to perform the kneading action effectively.

Figure 7:
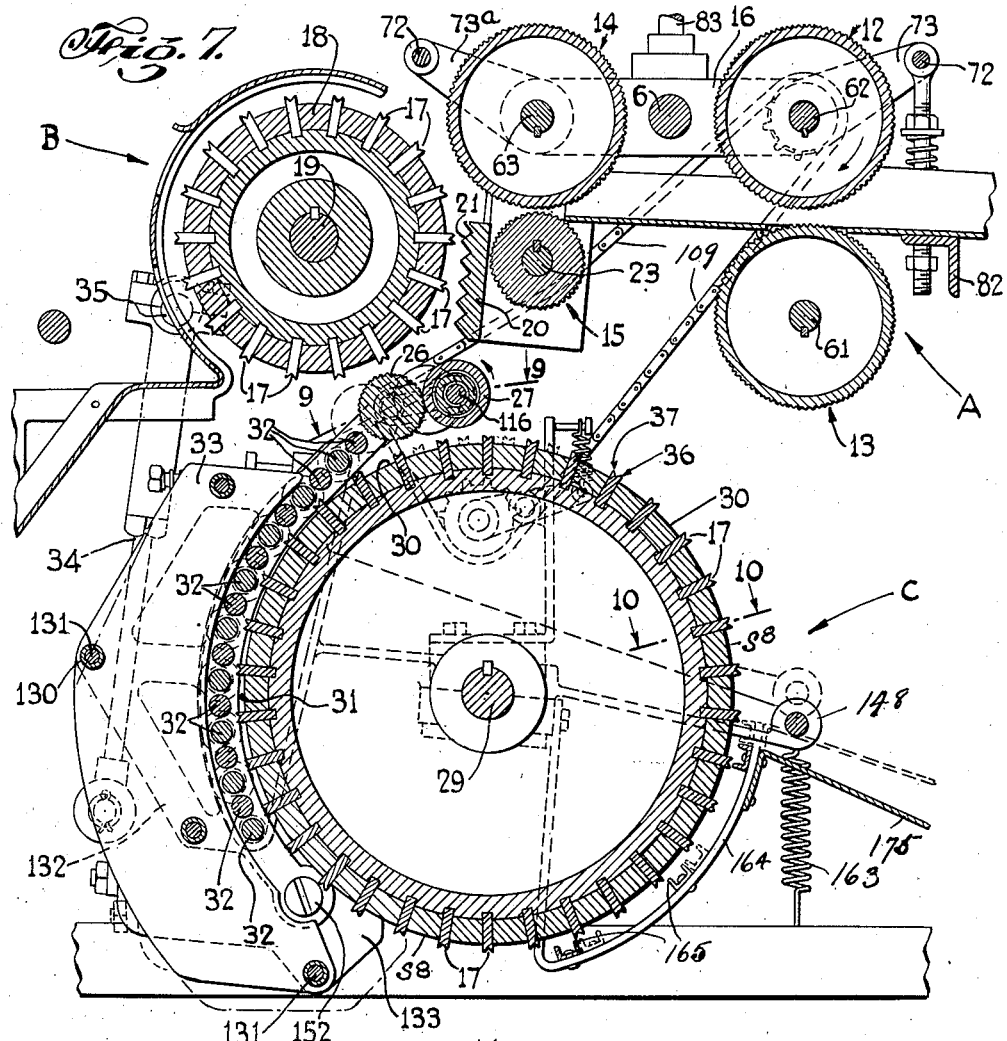
Fig. 7 is a view, like Fig. 3, in vertical section, but taken on the line 7—7 of Fig. 5.

This kneading head is shown in Fig. 7 at the upper end of its range of reciprocation, extending in part above the axial plane common to the axis of shaft 19 and the axis of the shaft 23 on which the head 20 and roll 15 are both mounted, the head being rocked in suitably timed movement by means to be described.

Figure 8:
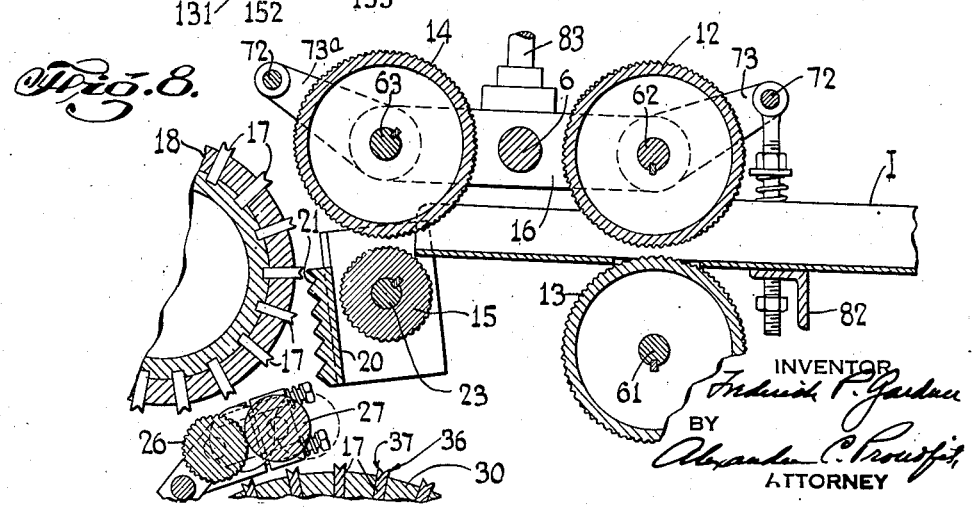
Fig. 8 is a fragmentary, detail view in vertical section, taken on the same line as Fig. 7, but showing the parts in a different operative position.

From the upper position the head 21 is depressed to a lower position, shown in Fig. 8 as well below the horizontal axial plane of shafts 19—23, and during this depression it draws the fibrous material forward and downward between the serrated face 21 and the edged instrumentalities 17. The rising movement of the face 21 of head 20 then exerts a backward, upward drag on the material which is again kneaded against the edged instrumentalities 17, the latter being adapted to exert an enhanced cleaning effect in this direction, as the face again approaches the position shown in Fig. 7, by reason of the fact that each of the edged instrumentalities has a double edge, as illustrated.

While the pre-cleaning of the fibrous material in the last-above described stage of treatment is being performed, the tendency of the rotor 18 to advance the material is controlled, in pursuance of an important object of the invention, partly by the roll-couple 14—15 and in part by the serrated face 21 of the kneading head, the material being held in suspension therebetween as the kneading and cleaning progresses.

In passing to the next phase of kneading treatment, the advancement of the material, thus pre-cleaned, is effected and controlled positively by the action of a pair of rolls 26, 27, which are positively rotated slowly and constantly in the direction indicated by the arrow, and the first effect of which is to hold the material in a somewhat slack stretch during downward action of the face 21, this provision for slack permitting abundant play of the material during the upward kneading action of the serrated face thereagainst.

From the rolls 26, 27, the pre-cleaned material is trained against a drum 30, fitted peripherally with a series of edged instruments 17 like those in rotor 18, the drum being rotated constantly in counter-clockwise direction, in the instance shown, by a shaft 29, while the stretch of material advancing from the roll couple 26—27 is kneaded against the edged instrumentalities on drum 30 by the action of a series of rollers 32, mounted in a sector 33 which is suitably oscillated by a pitman 34 actuated by eccentric 35 of driving mechanism to be described in connection with this and certain to-and-fro movements of which the sector is capable, with the rolls 26—27 and rolls 32 carried bodily thereupon.

The rollers 32 are disposed in arcuate arrangement substantially parallel with the path in which the edged instruments 17 are revolved by rotation of the drum 30, and closely adjacent to the rollers 32. Each of the rollers 32 is rotated around its own axis constantly by suitable means to be described.

The oscillation of the rollers 26, 27 and 32 bodily as a series causes the stretch of material in the space 31 between the drum 30 and rollers 32 to be drawn backward and forward, i. e., upward and downward, in the instance shown, and the rollers 32 knead the material first against the trailing edge 36 of each of the edged instruments and then against the leading edge 37 of each of the instruments. The edged instruments co-act in their turn against the series of rollers 32 by constantly and repeatedly pressing the material between the arcs of adjacent rollers of the series, and thus exercising a counter kneading action, at the same time exerting a cleaning and polishing action upon the fibers.

The rate of oscillation is so timed, with reference to the rotative rate of the drum 30, that the kneading and cleaning action of the complemental drum instruments and arcuate series of rollers active in this phase is exerted substantially simultaneously over the entire stretch of material throughout the region 31.

The disintegration accomplished by this action is more rapid and complete than that heretofore effected by any known machine of the class described, and is accompanied by a cleaning action that obviates any such clogging of the machine by non-fibrous solid components, or disruption of the fiber, and damage thereto as has accompanied the operation of known methods. The constant rotation of the rollers 32 acts to carry away from the fibers all detritus, and all the non-fibrous solids are discharged in finely divided form.

As already pointed out in the opening portion of this specification, the series of rollers 32 presents to the material, by reason of its frequency of oscillation as a series, the equivalent of a continuous surface of large area rather than of an interrupted surface composed of spaced linear regions of contact, such as would exist if the series of rollers was not oscillated bodily as a series.

This stage of the novel machine performs a polishing action upon the fibers, and also aids to keep them in parallel disposition for final delivery. It will be understood that this phase, while described illustratively as a single stage of the machine, may be performed by plural series of rollers in sets like those described, acting in conjunction with a plural series of rotors, as 30.

While being kneaded between the sector and drum, the fibers are held in suspension and drawn backward and forward as the sector oscillates bodily, and all the non-fibrous components are cleared away from the fibers.

The complete fibrous structure of the leaf, or other fiber-bearing material, stripped of all non-fibrous components, cleaned, polished and unharmed by its treatment, is thus made available for commercial use, being delivered by a conveyor or discharge means designated generally "D" in the drawings, the fibrous aggregate being discharged with the component fibers maintained in their original parallel disposition.

Having thus set forth concisely the combinative arrangement of the several mechanisms provided to perform the respective operations of preparation, pre-cleaning, and the complete kneading, cleaning, polishing and delivery of the fibrous structures, concurrently with the separate discharge of the non-fibrous solids and the liquid components of the original fibrous material, it is to be understood that the supporting structure for these mechanisms may be of any character suitable to permit their convenient assembly in co-ordinated relation to each other, and to afford a sturdy framework in which the various moving parts may be mounted to work with precision and with a minimum of frictional loss, noise, vibration, and deterioration in use.

In the particular physical embodiment of such a suitable frame herein illustrated, an especial object has been the provision of a compact machine of a portable character, capable of being moved about readily in the fields where pineapples are grown, so that the machine may be used in convenient proximity to the source of supply of the pineapple leaves, such use being of course merely illustrative of this portable characteristic of the novel machine and not limitative in any sense, as the compact arrangement of the machine qualifies it for use indoors with advantage equal to that of its field use, and a great variety of fiber-bearing plants may be treated by it. The machine is shown as having duplex sets of fiber-treating mechanisms, but it is to be understood that this does not exclude the use of a single set of such mechanisms, nor the use of more than two sets in a single machine, the duplex arrangement having been selected as illustrative of one convenient arrangement.

Figure 2:
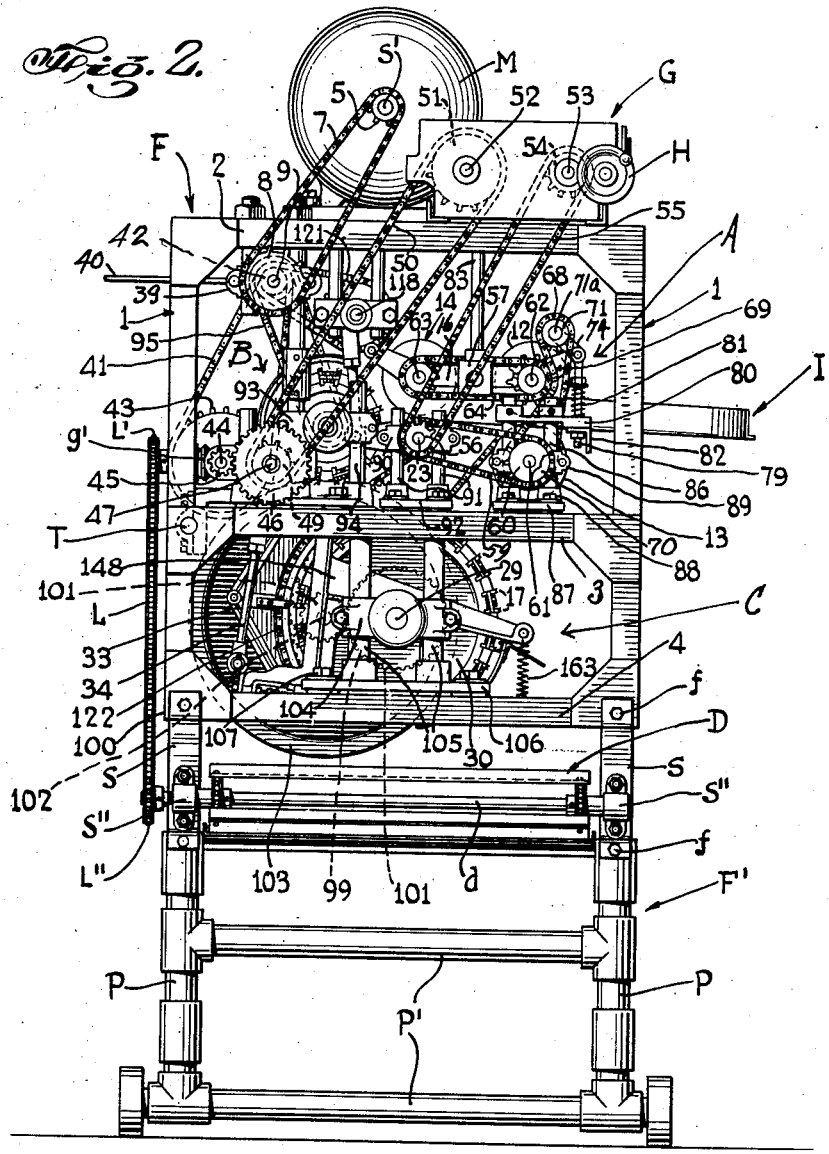
Fig. 2 is a view in end elevation thereof, looking from right to left on Fig. 1.

The machine shown comprises an upper framework section which is designated generally by the reference character F, and, as shown in Figs. 1 and 2, this framework is rectangular in shape, including upright corner members 1, a series of horizontal members 2, at the top of the machine, another horizontal series 3 at a lower level, and a third series 4 at the bottom of this section, which surrounds a roughly cubical or oblong space in which are mounted the two sets of preparatory mechanism each designated A, the pre-cleaning mechanisms B and the kneading, cleaning and polishing mechanisms C; together with an electric motor M to actuate these and other mechanisms, and a change-speed gear box G, both of which may desirably be mounted on the upper members 2, as shown in Figs. 1 and 2.

The framework section F constitutes, with the mechanisms now to be described, a unitary structure which, for the sake of convenience in transportation may be disassociated from any under structure, and it lends itself also readily to assembly with a carriage framework such as that shown in Figs. 1 and 2, where it is designated generally by the reference character F'.

It may conveniently be fabricated of tubular stock or pipes, including uprights P, and horizontal members P' assembled with such fittings as the couplings, T's, and castors shown in the drawings and which do not require detailed description, as they are of conventional character, easy to obtain on the open market, requiring only average skill to assemble, not readily damaged, and easy to transport when the upper framework F has been disconnected by removing the bolts f and straps S which serve as connecting pieces in the machine shown.

The straps S serve as supports for bearings s" in which are journalled the end shafts d of the conveyor D, to be described hereinafter, and as this may readily be disconnected from the overhead actuating mechanism by removal of the link belt L when the upper frame is removed for transportation, the conveyor D may be left in place on the understructure F' at all times.

Reverting now to description of the upper frame, and the mechanisms carried thereby, a sprocket gear 5 is shown on the motor shaft s' and from this gear a sprocket chain 7 runs to a sprocket gear 8 on a countershaft 9 which runs the entire length of the machine in the instance illustrated, although such disposition is not essential. At the other end of the machine a sprocket chain 41 runs from a sprocket wheel 42 on the shaft 9 to a sprocket wheel 43 on a shaft 44 which is parallel, and substantially co-extensive in length, with shaft 9. The shaft 9 is preferably provided with a clutch 39 of any suitable character, furnished with a controlling handle 40 by which the machine may be conveniently started and stopped.

The shaft 44 is fitted with a pinion 45 (see Fig. 2) in mesh with which is a larger sprocket gear 46 on a shaft 47, the latter having fixed at its outer end, as at 48, a sprocket gear 49 from which runs a sprocket chain 50 to a sprocket wheel 51 on the shaft 52 at the input side of the speed-change box G, which is of known form. A handwheel H controls the speed ratios applied to output shaft 53, on which is a sprocket wheel 54 connected by sprocket chain 55 to a sprocket wheel 56 on shaft 23, and the last-named shaft has a sprocket wheel (not shown), from which a sprocket chain 59 runs to a sprocket wheel 60 on the shaft 61 of the lower roll 13 of the first roll-couple of the preparatory train, hereinbefore described briefly.

Inasmuch as the shaft 23 is that upon which is fixed the lower roll 15 of the second roll-couple in the preparatory train, the sprocket chain 59 thus insures the co-rotation of the lower rolls 13 and 15, the last-named roll preferably being driven slightly faster to impart a slight stretch to the leaf or other fibrous material as the same passes from roll-couple 12—13 to roll-couple 14—15. The upper rolls 12 and 14 are fixed on shafts 62 and 63 journalled in suitable bearings in the tiltable member 16, and are connected for co-rotation by a sprocket chain 64 running between sprocket wheels 65, 66 on said shafts 62 and 63 (see Fig. 3).

A sprocket wheel 67 (see Fig. 5) is suitably arranged to be engaged with a stretch 69 of a sprocket chain 68, the latter running from a sprocket wheel 70 on shaft 61 (see Fig. 2) by which it is driven, thence up around an idler sprocket wheel rotatable on a shaft 71a which is supported by arms 74 carried by the structure above tilting bar 16 which has extensions 73. In these (see Fig. 5), a rod or brace 72 is mounted, adjustable by nuts 77, and eye-bolts 79 depend therefrom, passing through a cross-piece 82 mounted on brackets 80 (see Fig. 2) with springs 81 under compression between member 82 and tension-adjusting nuts 78, the springs serving to bias the arms 73 upwardly so as to maintain each roll 12 at a desired open position relatively to its coacting roll 13, as for example the position shown in Figs. 3 and 7. Each shaft 6 is mounted in blocks supported by hangers depending from the over-head frame structure.

In Fig. 13 is shown a modification of this balancing arrangement in which a weight 84, in the form of a sufficiently massive collar, is mounted adjustably upon a threaded extension 85 of each arm 86, which is otherwise like the tilting arm 16 already described. Lock nuts 87 are provided to hold the weight 84 in adjusted position. This figure shows, in dash-dot lines, a position assumed by the rolls 12, 14, when the roll 14 is lifted by entrance of a thicker leaf portion between it and roll 15 after the relatively thin point of the leaf has passed along in feeding.

In all of the figures each feed trough or guide is designated by the reference character I, and, as shown in Fig. 4, each trough may be conveniently supported upon one or more of the brackets 82, as by a stove-bolt connection at 85. Each bracket 82, in turn, derives its support from twin pillars 86 (see Fig. 2) extending upwardly from a common base 87 which is bolted to the frame member 3, as at 88. These pillars support also bearing brackets 89 in which is journalled the shaft 61. The brackets 89 can be adjusted to a desired position for the lower rolls 13 of each couple 12—13. A similar adjustable bearing bracket 90 for shaft 23 is carried by a pair of twin pillars 91 on a base 92 bolted to member 3 there being such a bracket at each end of the shaft, and another such pair of brackets 93 is mounted on each of a pair of sets of twin pillars 94 to serve as adjustable bearings for the shaft 19 of the rotor 18 described hereinabove in sufficient detail, with reference to Fig. 7.

Shaft 19 is driven by a sprocket chain 95, (Figs. 1 and 2) running from a sprocket wheel 96 on shaft 9 to a sprocket wheel 97 on the shaft 19, so that the edged instruments 17 on the rotor 18 are carried around constantly clockwise. The co-operating kneading movement effected by oscillating the serrated face 21 of kneading head 20 (see Fig. 3) upon shaft 23, as already stated briefly, is caused by the pitman 25, of which there are two, acting on arms 24. Each pitman (see Fig. 1) has a crankpin connection of known form at 115 with a shaft 118 slung in hangers 119 bolted at 120 to the overhead frames structure 2. The shaft 118 is driven from clutch shaft 9 by a link belt 121 and produces the kneading action already described in detail.

Passing now to the means for actuating the drum 30 and its cooperating sector 33 carrying the arcuate series of rollers 32, as shown in Fig. 3 and Fig. 7, the drum shaft 29 may now be identified in Figs. 1 and 2 as extending outside the upright frame structure 100 and having a gear 99 which meshes with a pinion 101 on the shaft 102 of a fly-wheel 103. The shaft 29 is shown in Fig. 1 and Fig. 2 as journalled at each end in a bearing bracket carried adjustably upon twin pillars 105, like those already described, extending from a base plate 106 bolted at 107 to one of the frame members 4.

The shaft 62 has a sprocket pinion 108 (see Fig. 5) at its end portion, and a sprocket chain 109 runs from sprocket pinion 108 under an idler 111 on the shaft 63 of the roll 14 of the preparatory train, the idler being loose between collars 112, and this sprocket chain 109 continues, as shown in Fig. 6, down to the shaft 113 of the roll 26 of the feed roll couple 26—27 on sector 33, and as this shaft has, at its other end, a pinion 114 in mesh with a pinion 115 on the shaft 116 of the roll 27, the sprocket chain 109 serves to rotate the feed couple 26—27 with a constant feeding action for the fibrous material received from the earlier stage of pre-treatment.

While I contemplate the use of any form of sector or carrier for the series of rollers 32 that will oscillate them bodily in parallelism with the path of the edged instrumentalities 17, whether that path be arcuate or not, still I have found in practise that distinct advantages result from the use of the particular physical embodiment of this feature of the invention illustrated in the drawings and which will now be described, having particular reference to Figs. 3, 5, 6 and 9, although reference to other figures will be included where pertinent.

In pursuance of an important object of the invention, I provide a balanced sector or carrier for the rollers 32, and for this purpose I have shown the sector 33 as comprising side plates 133 (see Fig. 6) having skeleton extensions 132 joined together by a set of long tiebolts 431 with sleeves 130 and end nuts 129 which co-operate to form a strong truss-like frame or cradle for the rollers 32, each of which, at one of its ends, enters a socket bearing 128 in one or the other of the side plates 131, (Fig. 9) while the other end of each roller, as 126, 127 transfixes one of the plates and is provided with a sprocket pinion 125 adapted to be driven by a sprocket chain 123, alternate rollers having similar sprocket pinions 124 adapted to be driven by a sprocket chain 122. These last-named sprocket chains are driven, each by a sprocket pinion on a roller journal near the feed roller 26 of the sector, one sprocket chain 134 for this purpose running from sprocket pinion 135 on the journal of roll 26 to sprocket pinion 136 on one of the shaft extensions 121, while a like sprocket chain 137 runs from a sprocket pinion 138, at the other end of roll 26, to a sprocket pinion 139 on roller 32a. Accordingly, all of the rollers on the sector are caused to rotate constantly in the same direction as roll 26, and each on its own axis, regardless of the direction in which the sector 33 is being oscillated at any time, i. e., whether downward in the direction of travel of the edged instruments 17 on the drum 30, or upward in the contrary direction, this oscillative movement being effected by the pitman 34 each of which has an eccentric connection of known form, as at 140, with a crank pin 35 on a crank disk of one of the short shafts 47. Each pitman is preferably made in two sections, with an adjusting nut 122 to regulate its length, each has a suitable connection, as by a pivot 143 held in a strap 144 bolted at 145 to a link 146 formed integrally with an arm 147 of a T-shaped lever 148 which rocks about the axis of the drum shaft 29, to which shaft it may be fixed if the shaft 29 is free, or it may be loose thereon if the shaft 29 rotates, with drum 30, or is non-rotatably held upon the pillar 150, the latter being bolted at 151 to the frame member 4. The rocker 148 constitutes the main support and actuating member for the sector 33 which is mounted thereon floatingly, as follows:

The lower end of the sector has a pivot stud bolt 152 which transfixes a block 153 mounted to slide in ways 154 formed in the link 146, this block being biased toward the right-hand end of the link by a spring 155 coiled under compression on a guide rod 156, and an abutment screw 157 determines adjustably the end of sliding movement of the block in that direction. The general purpose of the construction just described is to hold the arcuate series of rolls yieldingly toward the edged instruments 17 on drum 30 and to permit the rolls to give way backward if an obnormal obstruction is encountered in the fibrous material under treatment; also to insure uniformity of treatment upon fibrous material varying in thickness as it usually does to a substantial extent.

As a complemental device to permit this to-and-fro yielding compensatory movement, the rocker 148 has, upon its upright arm (see Fig. 3) a tension screw bolt 158 adjustable in the arm and transfixing a lug 159 upon the sector plate 132, between which lug and the bolt-head 161, a spring 160 is coiled under compression, biasing the lug, and consequently the sector, yieldingly toward the arm 147, in which an abutment screw 162 is provided to limit the action of spring 160. It will thus be seen that either or both of the springs 160 and 155 may yield to accommodate an obstruction, or obstructions, neither being dependent upon the other but each acting as a complement of the other if occasion arises.

The rocker 148 has another arm or arms 148', extending oppositely from the arm 147 and to which a tension spring 163 is connected as a suitable means to provide balanced action of the rocker and of the rollers carried by the sector, and this provision has been found in practise to yield a remarkable damping effect upon the vibrations incidental to the operation of the sector at the high frequence of oscillation which is desirable to cause the rollers 32 to act substantially as a continuous surface, as already described, instead of the spring, a suitable weight might be substitute, or equivalent damping means.

The structure shown at 164 is a "doctor", provided with means 165 to clear from the edged instruments 17 any detritus adhering thereto.

Fig. 3 shows at 166 a means adapted to tension the sprocket chain 109 and take up the slack formed therein when the rolls 26, 27 move upward with the sector 33. This device, in the instance illustrated, comprises an idler sprocket pinion journalled on a lever arm 167 adapted to rock on a pivot 168, the other end of the lever, 169, being provided with a tension spring 170 hitched to a bracket 171 which is bolted at 172 upon the bearing structure of shaft 29. The operation of such a tensioning means is well-known.

I have shown in Fig. 10 the details of the mounting of the edged instruments 17 in the drum 30, and in the instance illustrated I have provided a bridging piece 30x adapted to extend over tangs s7 at each end of each of the edged instruments, there being one of the bridging pieces for each two such adjacent tangs. Bolts s6 serve to hold the bridging pieces in place. Similar bolts s4 serve to hold in place spacing blocks s8 between the edged instruments (see Fig. 7).

A modification of the edged instrument structure is illustrated in Fig. 14, wherein the tangs s7 are held in sockets of the nature of eye-bolts s6 the bores of the sockets being designated by the reference characters 30'' and the depth of the bores being such as to permit the edged instruments 17 to yield against the bias of coil springs s5 under compression between the backs of the instruments and the underlying rim of the drum.

In a modification of the kneading mechanism illustrated in Fig. 11 of the drawings, a unit is shown comprising a preparatory mechanism A', an initial kneading and cleaning mechanism B' and a mechanism C' for completing the kneading, cleaning and polishing of the fibrous material, which in this instance follows a path indicated by the arrows in Fig. 11; viz., first through the feeding and preparatory train of roll-couples 12—13 and 14A—15A; combined and co-operating substantially as hereinbefore described; then between a rotor 18A, with edged instruments 17 like those already described, and a kneading head 20A of modified form, to be described in greater detail; and thence to a drum 30A over which the fibrous material is trained, being introduced thereto by the feeding action of a toothed roll 20x driven by a link-belt Ax running from the shaft 61 of the lower roller 13 of the first roll-couple.

Upon leaving the toothed roll, the material enters the bite between the drum 30A and the uppermost members of a series of rollers 32A mounted upon a sector 33A by which this series of rollers are oscillated upward and downward bodily as a series, acting to draw the material backward and forward as it is kneaded repeatedly between the rollers and the edged instruments 17 on the drum 30A, in the manner already described with reference to the drum 30 and the rollers 32.

The difference in action in the modification now under description emerges in the disposition of the novel form of reciprocating kneading head shown at 20A, having a serrated face member 21A which moves up and down in a vertical path across the face of the drum 18A as the plunger 25A rises and falls under the actuation of a suitable connection to a driving part of the machine (not shown).

The head 20A is formed with a slot 182 for the purpose of allowing play of the head relatively to the shaft 23A of the roll 15A, and the lower position of the serrated face 21A is indicated in dotted lines in Fig. 11, showing the extent of movement available for kneading and feeding action by the face 21A upon the material under treatment between it and the edged instruments 17. It will be observed that the direction of movement of the material is reversed as it is fed and kneaded by the face 21A toward the next stage of treatment, and the stretching, bending and kneading action exerted upon the material has been found a very effective mode of carrying out this preparatory stage of this stage of the cleaning and kneading of the material.

Indeed, so powerful is the action of the kneading head that I have found it possible to utilize it to effect completely the advancement of the fibrous material from this stage to the next stage, and at the same time prolong the kneading and cleaning action of the serrated face member of the kneading head, as illustrated in the modification shown in Fig. 12. A head 20B in this modification corresponds in general structure to that of the head 20A just described, and is similarly mounted to slide up and down with a plunger 25B, being guided in slides 180 bolted at 181 to a part F3 of the frame structure, as is the similar slide shown in Fig. 11.

The kneading head 20B of the present modification is, however, fitted with another serrated face member 22′, so that the material, as it passes from the face 21′ is not only more firmly held for its advancement, but is subjected to another kneading treatment as it advances, being pressed repeatedly against the edged instruments 17 therebeneath on the drum 30A (see Fig. 11). This constitutes virtually an extra kneading stage intermediate the stage of treatment between the rotor 18A and face 21′, and the stage of treatment between the drum 30A and the rollers 32A (see Fig. 1), and for some kinds of materials this added stage affords a variation of the kneading that is very effective.

It also makes it possible to dispense with a separate feeding instrumentality such as that constituted by the toothed roller 20x of Fig. 11, although it will be apparent to those skilled in the art that the roller 20x is itself an instrument for cleaning which exerts a desirable complementary action upon the material advanced by it, and here again the particular advancing means adopted for the treatment of any special kind of fiber-bearing material may be selected from among those illustrated according to the conditions encountered in each case, and other modifications may be made without departing from the idea of means underlying my invention as herein illustratively disclosed.

From the foregoing disclosure, it will be seen that the action of the several instrumentalities, co-operating in the manner set forth, is to exert upon the fibrous material an action which is effective in a three-fold manner, as follows:

Firstly, the fiber-bearing leaves are fed continuously by applying thereto frictional pressure of an order insufficient to crush the leaves, by means of a compensating floating cradle, carrying rolls which form therewith a unitary structure and compensate automatically for variations in thickness of the material from end to end; secondly, the fibrous material is subjected to treatment by edged instruments working simultaneously in opposition, without intersecting each other, against both sides of the material, certain of said instruments, (viz., the members in the rotor) acting constantly to advance the material while scarifying one side thereof; and the edged instrumentality at the other side of the material acting to scarify that side of the material while drawing the fibrous material backward and forward, the material being advanced progressively between said edged instruments, whereby the non-fibrous components associated with the fiber and kneaded and scarified with high frequency by said co-operating action of the instruments working from both sides of the material simultaneously, but not in intersecting paths; and thirdly the non-fibrous components are removed, by the conjoint action of the opposed instruments, from all surfaces of the individual fibers.

The "scarifying" action to which reference is made in the foregoing description and in the claims, is of the nature of an action which scratches or cuts the fleshy matrix of the leaf; opens up and scratches away; stirs up the opened flesh; and removes the fragments thus disassociated from the fibrous skeleton.

I claim:

1. In a machine for abstracting and preparing fiber from leaf fiber-bearing plants: means for feeding in continuous succession fiber-bearing leaves by applying thereto frictional pressure of an order insufficient to crush the leaves; means for treating the fibrous material comprising instruments working simultaneously in opposition to each other against both sides of the material; certain of said instruments acting constantly to advance the material while scarifying one side thereof, and the instruments at the other side of the material acting to scarify that side of the material while drawing it backward and forward, the material being advanced progressively between said instruments, whereby the non-fibrous components associated with the fiber are kneaded and scarified with high frequency, by the co-operative action of said instruments working simultaneously from both faces of the material and are thereby removed from all surfaces of the individual fibers.

2. In a machine for abstracting and preparing fiber from leaf fiber-bearing plants: mechanism for kneading and scarifying the fibrous material repeatedly while causing it to reciprocate repeatedly lengthwise, said mechanism including edged instruments, working simultaneously against both faces of the material, one series of said edged instruments revolving in a circular path and another edged instrument oscillating in a curved path closely adjacent to, but not intersecting the path of the revolving edged instruments.

3. A machine for abstracting and preparing fiber from leaf fiber-bearing plants, comprising the kneading and scarifying mechanism set forth in claim 2, and further characterized by having said mechanism constituted by edged instruments working simultaneously against both faces of the material, one instrument revolving in a circular path in opposition to an instrument oscillating in a curved path closely adjacent to, but not intersecting the path of the revolving instrument, said oscillating instrument having an up-and-down movement during which parts of the oscillating instrument move toward and away from the path of the revolving instrument, exerting alternately above and below its center line a compressional effect and a retractive effect upon the passing fibrous material therebetween, scarifying the material as it reciprocates lengthwise while advancing, whereby the non-fibrous components associated with the fiber are removed from the path of the advancing fibers.

4. A machine for abstracting and preparing fiber from leaf fiber-bearing plants: comprising the kneading and scarifying mechanism set forth in claim 2, and further characterized by having said mechanism constituted by instruments working simultaneously in opposition to each other against both faces of the material, including a set of edged instruments moved constantly in one direction, and another instrumentality oscillating backward and forward in kneading combination with said edged instruments.

5. A machine for abstracting and preparing fiber from leaf fiber-bearing plants, comprising kneading and scarifying mechanism constituted by edged instruments working simultaneously in opposition to each other against both faces of the material, including a set of edged instruments moved constantly in one direction, and another edged instrumentality oscillating backward and forward in kneading and scarifying combination with said set of constantly moving edged instruments.

6. A machine for abstracting and preparing fiber from leaf fiber-bearing plants, comprising a rotor having a series of edged instruments mounted to revolve constantly in one direction, in a curved path; a kneading instrumentality including an oscillating frame provided with a series of rollers, and means to rotate said rollers positively upon their individual axes while oscillating them bodily as a series in kneading engagement with said fibrous material.

7. A machine for abstracting and preparing fiber from fiber-bearing plants; comprising means to advance and prepare the fibrous material, said means including a series of roll-couples, at least one roll in one of said couples being mounted in oscillating relation with a roll in another couple, whereby upon the passage of material of a given thickness one of said rolls will be forced away from its companion roll in the same couple, and will cause the complemental roll in the other couple to approach its companion roll in that couple.

8. In a machine for abstracting and preparing fiber from leaf fiber-bearing plants, means for advancing the fibrous material, means for controlling the advancement of said material, and means for simultaneously applying to opposite faces of said material in non-intersecting paths a series of kneading and scarifying instruments, causing said instruments to change their positions relatively to the surface of said material constantly and with such frequency that as the material moves forward the non-fibrous material is disintegrated and removed.

9. In a machine for abstracting and preparing fiber from fiber-bearing plants, and in combination; means for preparing the fibrous material, and reducing the material to a uniform cross-section; an edged instrument, and means to knead and scarify said prepared material thereagainst while drawing the material backward and forward lengthwise across said edged instrument, and at the same time causing said instrument to advance in the direction of feeding the material while disposed transversely of the direction of travel; a series of edged instruments, and means to move them forward constantly; and a series of rollers carried by means adapted to move said series to and fro in a path in close proximity to the path of said edged instruments, but not intersecting said path whereby said fibrous material is concurrently subjected to the scarifying and kneading action of said series of rollers; and means to cause rotation of said rollers constantly and positively upon their individual axes as they are moved bodily as a series.

10. In a machine for preparing and abstracting fiber from leaf fiber-bearing plants; in combination; means for kneading, scarifying and cleaning the fibrous material and for separating the fibers laterally from each other, while maintaining them in parallel relation with each other, said means being characterized by a rotor provided with means for kneading and removing the non-fibrous matrix from the fiber, including a drum provided with a series of edged instruments mounted peripherally thereon parallel with the axis of the drum, and adapted to revolve in an arcuate path across which the edged instruments are extended; and a sector having mounted in arcuate series thereon a set of rollers parallel with the said edged instruments; and means to cause said sector to oscillate and thereby to move said rollers to and fro in arcuate parallelism with said edged instruments; and means to rotate each roller positively.

11. Means for kneading and removing the non-fibrous matrix from the fiber and for separating the fibers laterally while maintaining them in parallel relation, said means being characterized by a rotor provided with a peripheral series of edged instruments, adapted to revolve in an arcuate path, and a sector having mounted in arcuate series thereon a series of rolls, and means to cause said sector to oscillate bodily in a rotative path and thereby to move said rolls to and fro in an arcuate path parallel with said edged instruments.

12. A machine for abstracting and preparing fiber from fiber-bearing plants, comprising a rotor and sector mechanism as set forth in claim 11, and further characterized by having an auxiliary set of rollers mounted in said sector to control the travel of the material, means to revolve said set of rolls in unison with the series of rolls mounted in the sector, and means to cause said sector to oscillate and thereby to move both sets of rolls to and fro in arcuate parallelism with said edged instruments.

13. In a machine for abstracting and preparing fiber from leaf fiber-bearing plants, preparing mechanism comprising a train of feed rolls: mechanism for kneading said prepared material against a rotor provided with a peripheral series of edged instruments; and mechanism to complete the kneading, scarifying, cleaning and treatment of said fibrous material, characterized by a sector oscillating across the face of a rotor provided with a peripheral series of edged instruments, including means to control the passage of the material through said mechanisms, said mechanisms being respectively mounted in means for effecting adjustment of each of said mechanisms relatively to the others, to accommodate said machine to treatment of fibrous materials having varying dimensions and other structural characteristics.

14. A machine comprising the rotor and sector mechanisms combined and co-operating as set forth in claim 6 and further characterized by having said sector mechanism mounted flexibly at its extreme end in a frame permitting it to move flexibly in a tilting manner toward and away from the co-operating rotor while oscillating, whereby a varying pressure of the sector against the rotor is provided throughout their co-operating surfaces.

15. A machine for abstracting and preparing fiber from fiber-bearing plants, comprising the rotor and sector mechanisms combined and co-operating as set forth in claim 6, and further characterized by having said sector mechanism mounted pivotally, and means to bias said sector to a normally balanced condition of movement as it oscillates.

16. The method of abstracting and treating fibrous material from fiber-bearing plants, said method comprising the step of subjecting the fiber-bearing material to the scarifying co-action of a revolving force applied constantly forward in an arcuate path against one face of said material and an oscillating force applied in an arcuate path against the opposite face of said material, said paths being non-intersecting and said oscillating force tending to exert intermittently a cumulative forwarding action upon said material, and alternatingly to retract the material against the forwarding action of said revolving force.

17. The method of abstracting and treating fibrous material from fiber-bearing plants, said method comprising the step of advancing the fibrous material, the step of deflecting said material between a force moving forward constantly and an oscillatory force, the latter moving in an arcuate path about a centre removed from the path of the forwardly moving force and co-acting therewith in non-intersecting paths, said force acting to reciprocate the material lengthwise and also to scarify the material while it is deflected above and below the medial plane passing through the axes of said co-acting forces, and said oscillating force exerting in alternation a compressional force and a retractive force above and below said plane.

18. In the method of claim 16, the step of varying the intensity of the scarifying action upon the fibrous material, by increasing the arc through which the oscillatory force operates, also by increasing the oscillations of the oscillatory force, also by increasing the revolutions of the revolving force.

19. The method of abstracting and preparing fibers from fiber-bearing plants which comprises the step of advancing the fiber-bearing plant materials lengthwise and causing them to be deflected between a force moving forward constantly and an oscillatory force moving in an arcuate path across a plane passing through its centre line, towards and away from, and up and down relatively to the plane passing through the axes of rotation of said forces, said forces co-acting in nonintersecting paths.

20. The method of abstracting and preparing fibers from fiber-bearing plants as claimed in claim 19, said oscillating force causing the fibrous material to reciprocate lengthwise repeatedly while said other force acts constantly to feed the material forward; and the complemental step of simultaneously causing the material to be moved repeatedly into the nonintersecting paths of the opposed forces above and below their common centre line, whereby the fibrous material is subjected on all sides simultaneously to a scarifying action which separates the non-fibrous components from the useful fiber.

21. The method of claim 16, in which said co-acting forces act to scarify both faces of said material as it passes between said forces, and the step of culling the scarified non-fibrous components from the fibers.

FREDERICK P. GARDNER.